United States Patent
Nishida et al.

(10) Patent No.: US 6,285,429 B1
(45) Date of Patent: Sep. 4, 2001

(54) LIQUID CRYSTAL DISPLAY DEVICE AND METHOD FOR ITS PRODUCTION

(75) Inventors: Shinichi Nishida; Makoto Watanabe; Kimikazu Matsumoto, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/234,115

(22) Filed: Jan. 19, 1999

(30) Foreign Application Priority Data

Jan. 19, 1998 (JP) .................................................. 10-007634

(51) Int. Cl.[7] .................................................. G02F 1/1345
(52) U.S. Cl. ............................................. 349/141; 349/118
(58) Field of Search .................................. 349/141, 117, 349/118, 119, 120, 121

(56) References Cited

U.S. PATENT DOCUMENTS

| | | | | |
|---|---|---|---|---|
| 5,745,207 | * | 4/1998 | Asada et al. | 349/141 |
| 5,946,066 | * | 8/1999 | Lee et al. | 349/141 |
| 6,005,650 | * | 12/1999 | Kim et al. | 349/130 |
| 6,097,465 | * | 8/2000 | Hiroki et al. | 349/141 |
| 6,115,095 | * | 9/2000 | Suzuki et al. | 349/141 |

FOREIGN PATENT DOCUMENTS

| | | |
|---|---|---|
| 2-287317 | 11/1990 | (JP) . |
| 5-113561 | 5/1993 | (JP) . |
| 6-160878 | 6/1994 | (JP) . |
| 6-260878 | 6/1994 | (JP) . |
| 7-72491 | 3/1995 | (JP) . |
| 8-292522 | 11/1996 | (JP) . |
| 9-80424 | 3/1997 | (JP) . |
| 9-230364 | 9/1997 | (JP) . |
| 10-26766 | 1/1998 | (JP) . |
| 10-54982 | 2/1998 | (JP) . |
| 10-153782 | 6/1998 | (JP) . |

OTHER PUBLICATIONS

H. Wakemoto et al., "An Advanced In–Plane–Switching Mode TFT–LCD", SID 97 DIGEST, May 13, 1997, pp. 929–932.

S. Aratani et al., "Complete Suppression of Color Shift in In–Plane Switching Mode Liquid Crystal Displays with a Multidomain Structure Obtained by Unidirectional Rubbing", Jpn. J. Appl. Phys. vol. 36, No. 1A/B, Jan. 15, 1997, pp. L27–L29.

O Plus E, Jan. 1997, p. 102.

* cited by examiner

Primary Examiner—Kenneth Parker
(74) Attorney, Agent, or Firm—Sughrue, Mion, Zinn, Macpeak & Seas, PLLC

(57) ABSTRACT

In a liquid crystal display device of a lateral electric field driving system, coloring problem in display is prevented in all the white, intermediate tone and the black display mode. In this liquid crystal display device: one of an incident side polarizing plate and an exit side polarizing plate has its polarizing axis substantially coincide with the direction of the orientation of a liquid crystal layer; an optical compensating layer is interposed between at least one of transparent substrates and the incident side polarizing plate or the exit side polarizing plate both disposed outside the at least one of the transparent substrates, the optical compensating layer having a refractive index anisotropy with the other polarity other than that in the refractive index of the liquid crystal layer; and, the optical compensating layer has the direction of its anisotropy axis substantially coincide with the direction of the orientation of the liquid crystal layer, provided that the orientation direction includes a predetermined pre-tilt angle.

6 Claims, 9 Drawing Sheets

6; transparent insulation substrate

7: orientation film

6

LIQUID CRYSTAL DISPLAY DEVICE AND METHOD FOR ITS PRODUCTION

BACKGROUND OF THE INVENTION

1. Field of the Invention

The present invention relates to a liquid crystal display device and a method for its production, and more particularly to an active matrix type liquid crystal display device using a lateral electric field driving system and a method for the production thereof.

2. Description of the Related Art

Since an active matrix type liquid crystal display device (AMLCD) using thin film transistors (TFTs) of field effect type used as switching devices for its pixels is excellent in image quality, AMLCD has been widely used as a monitor of a portable computer or of a desktop computer of a space-saving type.

Recently, particularly, in order to improve the characteristics of view angle, a display method using a lateral electric field has been proposed.

In this proposed method, for example, as disclosed in Japanese Patent Laid-Open No. Hei 6-160878, a pixel electrode and its counter electrode are formed in parallel to each other on the same substrate. In driving the thus formed liquid display device, a voltage is applied between these electrodes to establish an electric field in parallel to the substrates, so that the direction of an anisotropic axis (i.e., director) of the liquid crystal is varied in a plane parallel to a surface of the substrate, whereby a transmission luminous energy is controlled.

Due to this, it is possible for such liquid crystal display device to obtain a pixel capable of having substantially the constant brightness even when viewed from a view point varying in a wide view angle. In contrast with a twisted nematic (TN) system, there is no fear that the liquid crystal director is so energized as to deviate from a surface of the substrate, which causes the relationship between the transmission luminous energy and the applied voltage to considerably vary, the relationship being obtained when the liquid crystal display device is viewed in a direction parallel to the liquid crystal director.

In general, a conventional liquid crystal display device such as one disclosed in the above Japanese Patent Laid-Open No. Hei 6-160878 has a construction in which: the liquid crystal director is homogeneously oriented in a predetermined direction substantially parallel to the substrate (homogeneous orientation); as shown in FIG. 11, the liquid crystal layer is sandwiched between a pair of polarizing plates so as to have their polarizing axes crossed with each other at right angles; and, the polarizing axis of one of the polarizing plates is coincident with the direction of orientation of the liquid crystal director. Due to such construction, it is possible to steadily lower the black level in brightness by displaying the black when no voltage is applied and by rotating the liquid crystal director upon application of a voltage to display the white.

Further, in order to improve the liquid crystal device in coloring problem occurring when the device displaying the white is viewed from an oblique direction, there is proposed a construction in which each of the pixel electrode and its counter electrode is bent into a V-shaped form in each of the pixels, as shown in FIG. 12 (for example, see "O Plus E, January issue for 1997, page 102). In this construction, when a voltage is applied between these electrodes, two electric fields different in direction are established to cause the liquid crystal molecule to twist in two directions.

In its white display mode, when the liquid crystal display device is viewed from an oblique direction C, a region 1 in which the liquid crystal director is oriented to a direction "A" assumes red color. On the other hand, a region 2 in which the liquid crystal director is oriented to a direction B assumes blue color. Since these colors in such two regions are compensated with each other, it is possible to considerably relieve the coloring problem appearing when the liquid crystal device displaying the white is viewed from the oblique direction.

Further, in Japanese Patent Laid-Open No. Hei9-80424, there is proposed a method in which: in the liquid crystal display device of a lateral electric field system, in order to prevent the coloring problem from occurring when a display screen of the liquid crystal display device in its white display mode is viewed from an oblique direction, a double refraction medium is interposed between the opposite substrates or the like and the polarizing plates. In this proposed method, when a maximum driving voltage is applied, i.e., in the white display made, an anisotropic axis of the double refraction medium coincides in direction with each of the liquid crystal director and the polarizing axes of the polarizing plates.

A problem to be resolved by the present invention is as follows:

In the former of the conventional methods, when the liquid crystal display device is in its intermediate tone display mode or in its white display mode, since the regions 1 and 2 having been twisted in two different directions are compensated with each other, it is possible to considerably prevent the coloring problem from occurring when the liquid crystal display device is viewed from an oblique direction.

However, in the black display mode, when the liquid crystal display device is viewed from the oblique direction, in the strictest sense of the word, the direction of the liquid crystal director is not coincident with the direction of the polarizing axis, which results in a retardation, i.e., delay in phase. Due to this, when the liquid crystal display device displaying the black is viewed in the oblique direction, a reddish or a bluish coloring problem occur, depending on the direction from which the display is viewed.

Further, in the conventional method disclosed in Japanese Patent Laid-Open No. Hei9-80424, in the black display mode, the anisotropic axis of the double refraction medium is different in direction from the polarizing axis of the polarizing plate. Due to this, it is impossible for the conventional method to prevent the coloring problem from occurring in the black display mode.

SUMMARY OF THE INVENTION

Under such circumstances, the present invention was made. Consequently, it is an object of the present invention to provide an active matrix type liquid crystal display device using a lateral electric field driving system, which is capable of preventing a coloring problem in any of a white display mode, an intermediate tone display mode and a black display mode.

According to a first aspect of the present invention, the above object of the present invention is accomplished by providing:

In a liquid crystal display device comprising: a first and a second transparent substrate oppositely disposed and spaced apart from each other through a cell gap; a liquid crystal layer which has a refractive index anisotropy with one polarity and homogeneously oriented in parallel to a surface of the transparent substrate; a first and a second polarizing plate having their polarizing axes crossed with each other at right angles, the first and the second polarizing plate being disposed outside the first and the second transparent substrate; wherein a pixel electrode and its counter electrode opposite thereto are formed for every pixel on the first transparent substrate, and a voltage is applied between the pixel electrode and the counter electrode to establish an electric field in parallel to a surface of the transparent substrate, whereby the liquid crystal layer is controlled in its orientation, the improvement wherein:

one of the first and the second polarizing plate has its polarizing axis substantially coincide with the orientation direction of the liquid crystal layer;

an optical compensating layer is interposed between at least one of the first and the second transparent substrate and one of the first and the second polarizing plate disposed outside the at least one, the optical compensating layer having a refractive index anisotropy with the other polarity other than that in the refractive index of the liquid crystal; and the optical compensating layer has the direction of its anisotropy axis substantially coincide with the orientation direction of the liquid crystal layer, provided that the orientation direction includes a predetermined pre-tilt angle.

According to a second aspect of the present invention, the above object of the present invention is accomplished by providing:

The liquid crystal display device as set forth in the first aspect of the present invention, wherein:

each of the pixels is provided with a plurality of regions formed between the pixel electrode and the counter electrode, the regions being different form each other in direction of electric field;

an angle, which is formed between the direction of the electric field and that of the orientation of the liquid crystal layer free from the electric field, is substantially constant in any of the regions; and the liquid crystal layer of the regions permits its liquid crystal molecules to rotate in opposite directions to each other when the electric field is established.

According to a third aspect of the present invention, the above object of the present invention is accomplished by providing:

The liquid crystal display device as set forth in the first or the second aspect of the present invention, wherein:

a product of ΔnL and dL is substantially equal to a product of ΔnF and dF,

ΔnL is a difference in the refractive index anisotropy of the liquid crystal layer, dL is the thickness of the liquid crystal layer, ΔnF is a difference in the refractive index anisotropy of the optical compensating layer, and dF is the thickness of the optical compensating layer.

According to a fourth aspect of the present invention, the above object of the present invention is accomplished by providing:

The liquid crystal display device as set forth in any one of the first, second and the third aspect of the present invention, wherein:

at least formed on the first transparent substrate are: a plurality of scan lines; a plurality of signal lines extending in a direction substantially perpendicular to the scan lines; and, a plurality of switching elements disposed in the vicinities of the intersections of the scan lines and the signal lines, each of the switching elements being connected with the pixel electrode.

According to a fifth aspect of the present invention, the above object of the present invention is accomplished by providing:

A method of producing a liquid crystal display device, comprising the steps of:

forming a pixel electrode and its counter electrode on a surface of a first transparent substrate for every pixel;

oppositely disposing a second transparent substrate from the first transparent substrate so as to form a cell gap therebetween, in which cell gap a liquid crystal layer having a refractive index anisotropy with one polarity is formed and homogeneously oriented in a direction substantially parallel to a surface of the transparent substrate;

forming an optical compensating layer outside one of the first and the second transparent substrate in a manner such that the optical compensating layer has the direction of its anisotropy axis substantially coincide with the direction of the orientation of the liquid crystal layer, provided that the orientation includes a predetermined pre-tilt angle, the optical compensating layer having a refractive index anisotropy with the other polarity other than that in the refractive index of the liquid crystal; and forming a first and a second polarizing plate having their polarizing axes crossed with each other at right angles, the first and the second polarizing plate being disposed outside the compensating layer and outside the first and the second transparent substrate, one of the first and the second polarizing plate having its polarizing axis substantially coincide with the direction of the orientation of the liquid crystal layer.

According to a sixth aspect of the present invention, the above object of the present invention is accomplished by providing:

The method of producing the liquid crystal display device, as set forth in the fifth aspect of the present invention, wherein:

each of the pixels is provided with a plurality of regions formed between the pixel electrode and the counter electrode, the regions being different form each other in direction of electric field;

an angle, which is formed between the direction of the electric field and that of the orientation of the liquid crystal layer free from the electric field, is substantially constant in any of the regions; and the liquid crystal layer of the regions permits its liquid crystal molecules to rotate in opposite directions to each other when the electric field is established.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Hereinbelow, the preferred embodments of the present invention will be described with reference to the accompanying drawings.

Figure 1A:
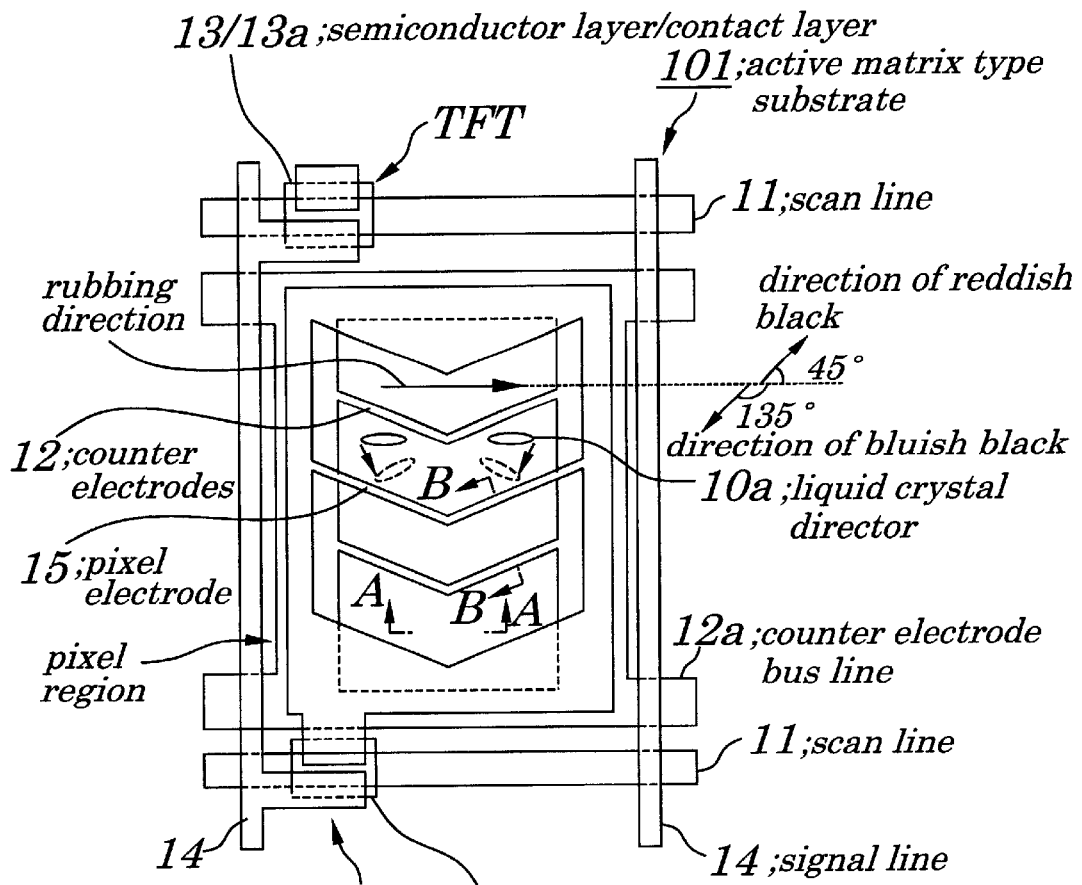
FIG. 1(a) is a plan view of an essential part of the liquid crystal display device of an embodiment of the present invention.
Figure 2:
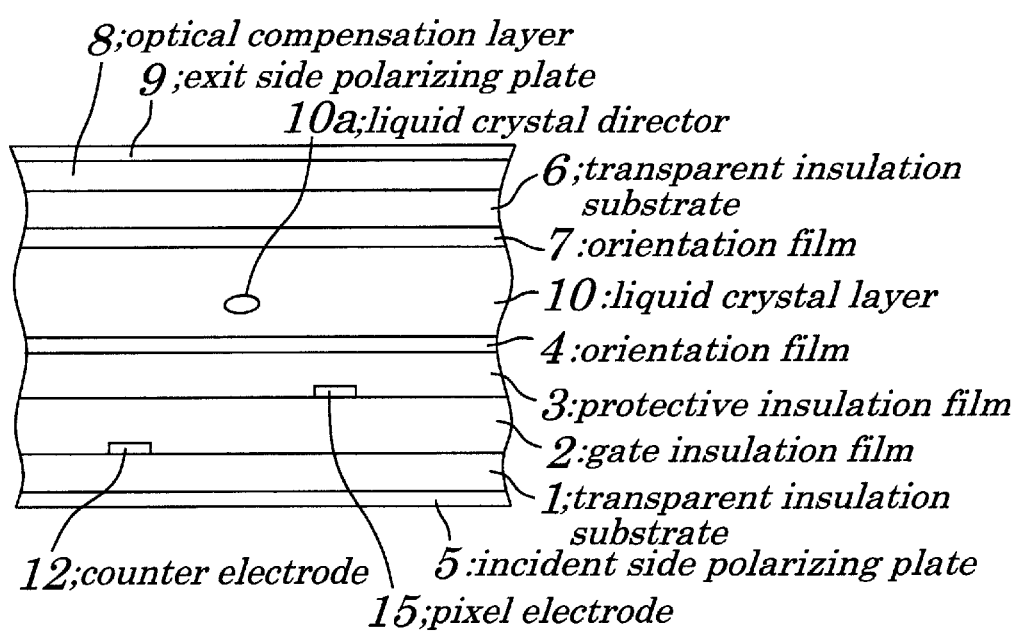
FIG. 2 is a cross-sectional view of the essential part of the liquid crystal display device, taken along the line B—B of FIG. 1(a)
Figure 3A:
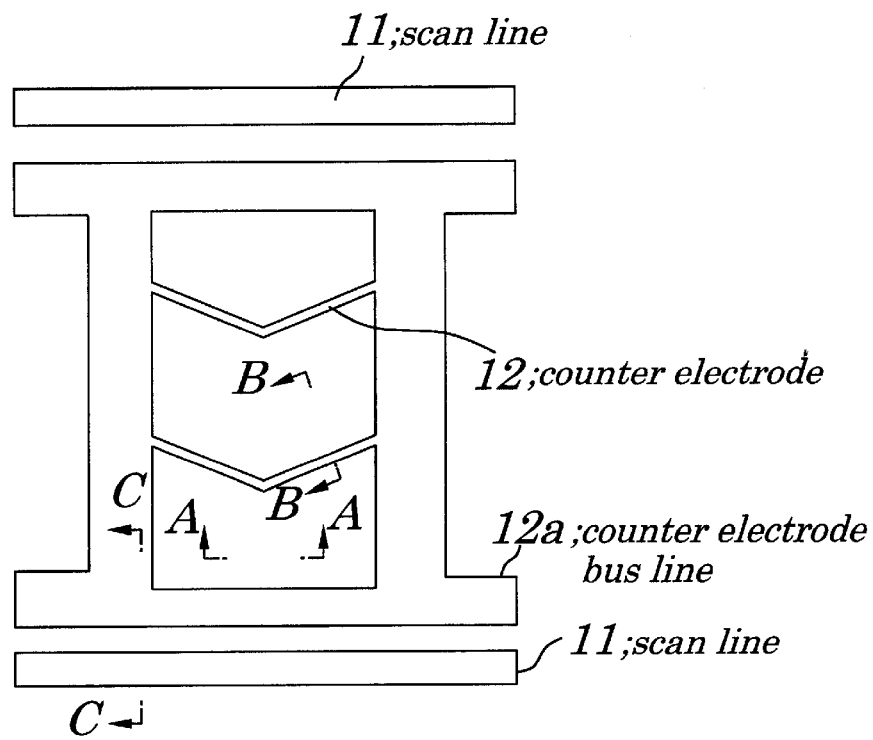
FIG. 3(a) is a plan view of an essential part of the active matrix type substrate in the liquid crystal display device of the present invention, illustrating the method of producing the liquid crystal display device.
Figure 3B:
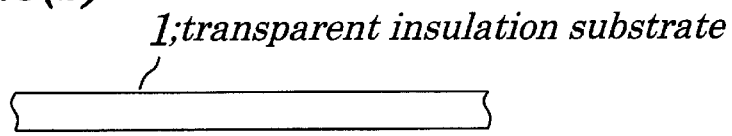
FIG. 3(b) is a cross-sectional view of the essential part of the substrate, taken along the line A—A of FIG. 3(a)
Figure 3C:
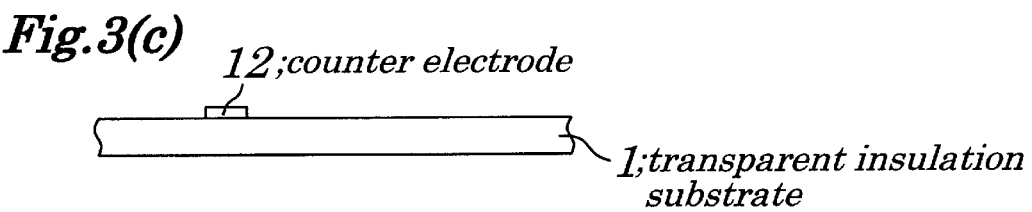
FIG. 3(c) is a cross-sectional view of the essential part of the substrate, taken along the line B—B of FIG. 3(a)
Figure 3D:
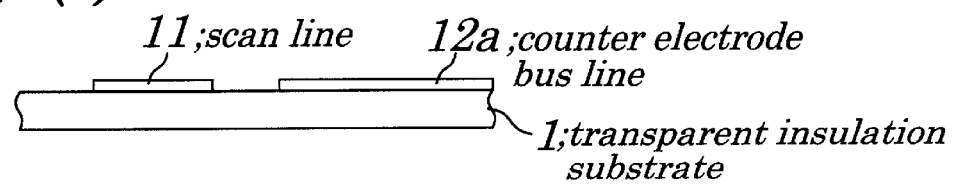
FIG. 3(d) is a cross-sectional view of the essential part of the substrate, taken along the line C—C of FIG. 3(a)
Figure 4A:
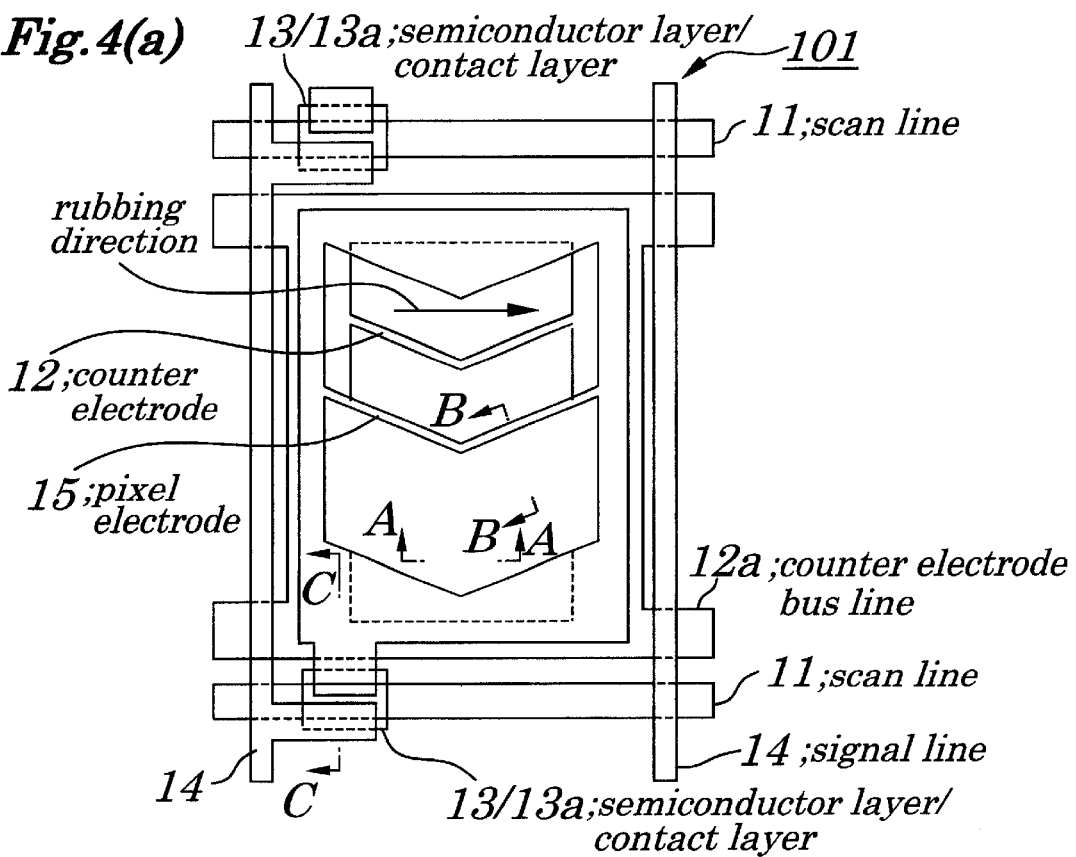
FIG. 4(a) is a plan view of an essential part of the active matrix type substrate in the liquid crystal display device of the present invention, illustrating the method of the production of the liquid crystal display device.
Figure 4B:
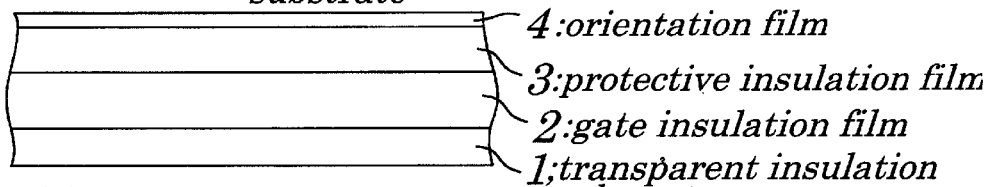
FIG. 4(b) is a cross-sectional view of the essential part of the substrate, taken along the line A'—A' of FIG. 4(a)
Figure 4C:
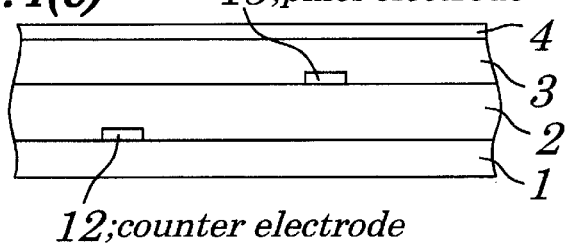
FIG. 4(c) is a cross-sectional view of the essential part of the substrate, taken along the line B'—B' of FIG. 4(a)
Figure 4D:
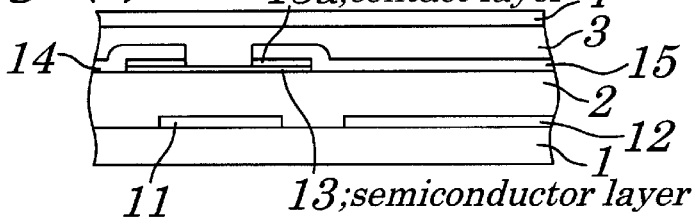
FIG. 4(d) is a cross-sectional view of the essential part of the substrate, taken along the line C'—C' of FIG. 4(a)

In an embodiment of a liquid crystal display device of the present invention, as shown in FIG. 1(a), a plurality of scan lines 11 and a plurality of signal lines 14 are disposed in a matrix orientation on one of transparent insulation substrates of the liquid crystal display device. In the vicinity of the intersection of each of the scan lines 11 and each of the signal lines 14, there is disposed a field effect type TFT having a construction in which: an island-shaped amorphous silicon layer serves as a semiconductor layer 13; and, the scan line serves as a gate electrode. In the above construction, regions surrounded by the scan lines hand the signal lines 14 define pixel regions. In each of these pixel regions, each of the counter electrodes 12 and each of the pixel electrodes 15 are disposed in parallel to each other in a manner such that each of them is bent in center so as to be formed into a substantially V-shaped form in parallel to each other, as shown in FIG. 2. Each of the pixel electrodes 15 is connected with a source electrode of the TFT, and the signal line 14 is connected with a drain electrode of the TFT. In this case, the scan line 11 also serves as a gate electrode of the TFT.

In operation, when the scan line 11 is energized, a potential of the signal line 14 is written, so that an ac voltage is applied between the signal line 14 and the counter electrode 12 having been kept at a predetermined potential due to a counter electrode bus line12a.

The liquid crystal layer 10 sandwiched between a pair of the transparent insulation substrates 1, 6 through orientation films 4, 7 is oriented in the rubbing direction of the orientation films 4, 7 until the electric field is established. When angles formed between the orientation direction and the directions of the electric fields in the above two regions are expressed by the reference characters α1 and α2, as shown in FIG. 1(a), the following equation is established:

$$\alpha 1 = \alpha 2 \tag{1}$$

Namely, α1 is equal to α2. When a voltage is applied between these electrodes 12, 15, two electric fields different in direction from each other are established since each of the electrodes is bent in its central portion. Due to the presence of these electric fields, the liquid crystal in a left half of the pixel rotates counterclockwise, while the liquid crystal in a right half of the same pixel rotates clockwise.

Figure 1B:
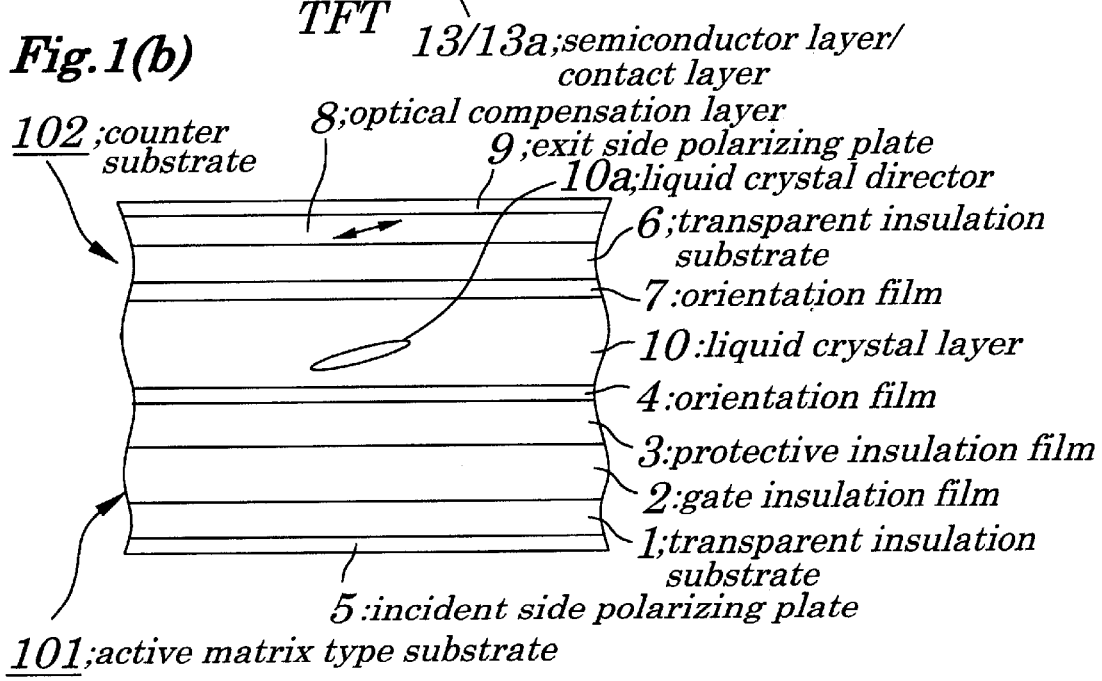
FIG. 1(b) is a cross-sectional view of the essential part of the liquid crystal display device, taken along the line A—A of FIG. 1(a)

Further, as shown in FIG. 1(b), disposed outside the pair of the transparent insulation substrates 1, 6 are a pair of polarizing plates 5, 9. In addition, an optical compensation layer 8 is sandwiched between the transparent insulation substrate 6 and the polarizing plate 9. The optical compensation layer 8 has a uniaxial refractive index anisotropy. The anisotropic axis of the compensation layer 8 is so oriented as to be parallel to the orientation direction of the liquid crystal director 10a which is free from any electric field and includes a pre-tilt angle. Here, when a difference in refractive index anisotropy of the optical compensation layer 8 is expressed by ΔnF, the thickness of the same layer 8 is expressed by dF, a difference in refractive index anisotropy of the liquid crystal layer 10 is expressed by ΔnL, and the thickness of the same layer 10 is expressed by dL, the following equation is established:

$$\Delta nF \times dF = \Delta nL \times dL \tag{2}$$

The absorption axis (which is perpendicular to the polarizing axis) of the incident side polarizing plate 5 is so oriented as to be parallel to the rubbing direction. On the other hand, the absorption axis of the exit side polarizing plate 9 is so oriented as to be perpendicular to the absorption axis of the incident side polarizing plate 5.

Due to the above construction, it is possible to prevent a coloring problem inherent in retardation from occurring in the liquid crystal layer 10 when the layer 10 is in its black display mode and is viewed from an oblique direction. which may improve the black display mode in image quality.

On the other hand, since the optical compensation layer 8 has the projection of its refractive index anisotropoic axis aligned with the polarizing axis of the exit side polarizing plate 9, there is no fear that a retardation due to the presence of the optical compensation layer 8 occurs. Consequently, when the liquid crystal display device is viewed from its front side, the optical compensation layer 8 does not adversely affect the front display properties of the liquid crystal display device at all.

Further, a retardation occurring when the liquid crystal display device is viewed from an oblique direction is slight in itself, and may cancels a slight retardation occurring when the liquid crystal display device in its black display mode is viewed from an oblique direction. Consequently, in the white display mode and the intermediate tone display mode, since a retardation occurring when the liquid crystal layer is viewed from an oblique direction is sufficiently slight, such retardation substantially does not adversely affect the view angle properties of the liquid crystal layer 10 in its white and intermediate tone display modes.

As described above, in the white and intermediate tone display modes, since the liquid crystal rotates counterclockwise in the left half of the pixel and rotates clockwise in the right half of the same pixel, it is possible for these halves of the pixel to compensate with each other, which enables the liquid crystal display device to be substantially free from the coloring problem inherent in the In-Plane Switching (IPS) when viewed from an oblique direction.

Now, referring to FIGS. 3 to 5, a method of producing the liquid crystal display device having the above construction will be described.

The active matrix type substrate 101 (FIG. 1) having the above construction is produced as follows: namely, As shown in FIGS. 3(*a*) to 3(*d*), a chromium film having a thickness of approximately 150 nm is deposited to the transparent insulation substrate 1, and then subjected to a patterning process comprising photolithography and etching steps, so that both the counter electrode bus line 12*a* and the scan lines 11 are formed. The counter electrode bus line 12*a* laterally extends in each of an upper and a lower portion of the pixel. Also formed through the above process are V-shaped counter electrodes 12 connected with the counter electrode bus line 12*a* in a central area of the pixel.

After that, as shown in FIGS. 4(*a*) to 4(*d*), further deposited to the transparent insulation substrate 1 in sequence are: a gate insulation film 2 constructed of a silicon nitride film having a thickness of approximately 400 nm; a semiconductor layer 13 constructed of an amorphous silicon film having the thickness of approximately 350 nm; and, a contact layer 13*a* constructed of an n-type amorphous silicon film having a thickness of approximately 300 nm, wherein these components are so patterned as to assume island shapes so that a TFT portion is formed. In this case, the semiconductor layer 13 is formed on the scan line 11 which also serves as a gate electrode of the TFT.

Subsequent to the above, the chromium film having a thickness of approximately 150 nm is deposited to this semiconductor layer 13, and then subjected to a patterning process comprising photolithography and etching steps, so that the pixel electrode 15 assuming a substantially V-shaped form is formed in the central area of the pixel so as to extend in parallel to the counter electrodes 12. Also formed together with this pixel electrode 15 is a signal line 14, which is positioned in each of opposite side areas of the pixel and intersects with the scan line 11.

After that, a protective insulation film 3 constructed of a silicon nitride film having a thickness of approximately 200 nm is deposited to the signal lines 14. Then, in order to permit peripheral terminals to be connected with individual bus lines, the insulation layer is removed. In this embodiment, the V-shaped pixel electrode 15 and its counter electrodes 12 are spaced apart from each other by a distance of approximately 10 μm so as to extend in parallel to each other. Each of these electrodes 12, 14 has a width of approximately 3 μm.

Figure 5A:
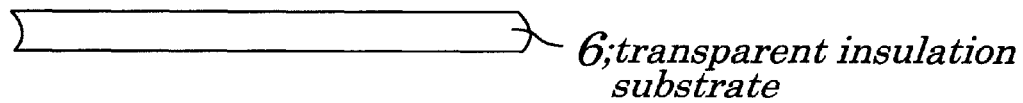
FIG. 5(a) is a cross-sectional view of the transparent insulation counter substrate, illustrating the method of the production of the liquid crystal display device of the present invention.
Figure 5B:
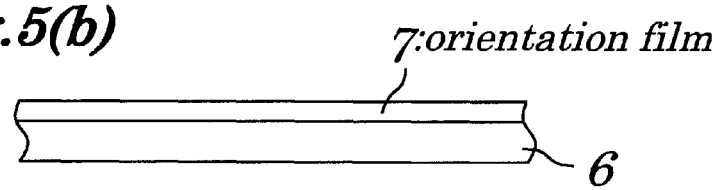
FIG. 5(b) is a cross-sectional view of the orientation film of the counter substrate shown in FIG. 5(a)

Subsequent to the above, as shown in FIGS. 5(*a*) and 5(*b*), a color filter is formed in each of the pixels on the transparent insulation substrate 6. Then, a counter substrate 102 is formed.

After that, orientation films 4 and 7 are applied to the above active matrix type substrate 101 and the counter substrate 102 including the color filter at every pixel, respectively. The thus applied orientation films 4, 7 are then subjected to a rubbing process which is performed in parallel to a direction in which the scan line 11 extends.

These substrates are bonded to each other in a condition in which they are spaced apart from each other to form therebetween a cell gap dLC, and have their peripheral portions fixed by means of sealing members. This cell gap is then filled with liquid crystal substance, which is injected and sealed therein. The cell gap dLC has a width of approximately 4.5 μm. The injected liquid crystal substance has a difference ΔnL in refractive index anisotropy of 0.067. At this time, as shown in FIG. 1, the liquid crystal director 10*a* is homogeneously oriented in parallel to the rubbing direction. In this case, the liquid crystal molecule has a predetermined pre-tilt angle relative to the surface of the substrate.

Further, the optical compensation layer 8 is applied to an outer side of the counter substrate in the color filter side. The optical compensation layer 8 has a negative uniaxial refractive index anisotropy, and has the direction of its refractive index anisotropy including the pre-tilt angle be parallel to the liquid crystal director 10*a*.

Further, a product of: the difference ΔnF in refractive index anisotropy of the optical compensating layer 8; and, the thickness dF of the same layer 8 is equal to ΔnLC×dLC, i.e, equal to approximately 302 nm.

Applied to the outermost opposite surfaces of the above assempy of the liquid crystal display device are the incident side polarizing plate 5 and the exit side polarizing plate 9. At this time, the absorption axis of the incident side polarizing plate 5 extends in parallel to the projection of the liquid crystal director 10*a* projected onto the surface of the substrate. On the other hand, the absorption axis of the exit side polarizing plate 9 extends in parallel to the surface of the substrate, and is perpendicular to the absorption axis of the incident side polarizing plate 5.

Figure 6:
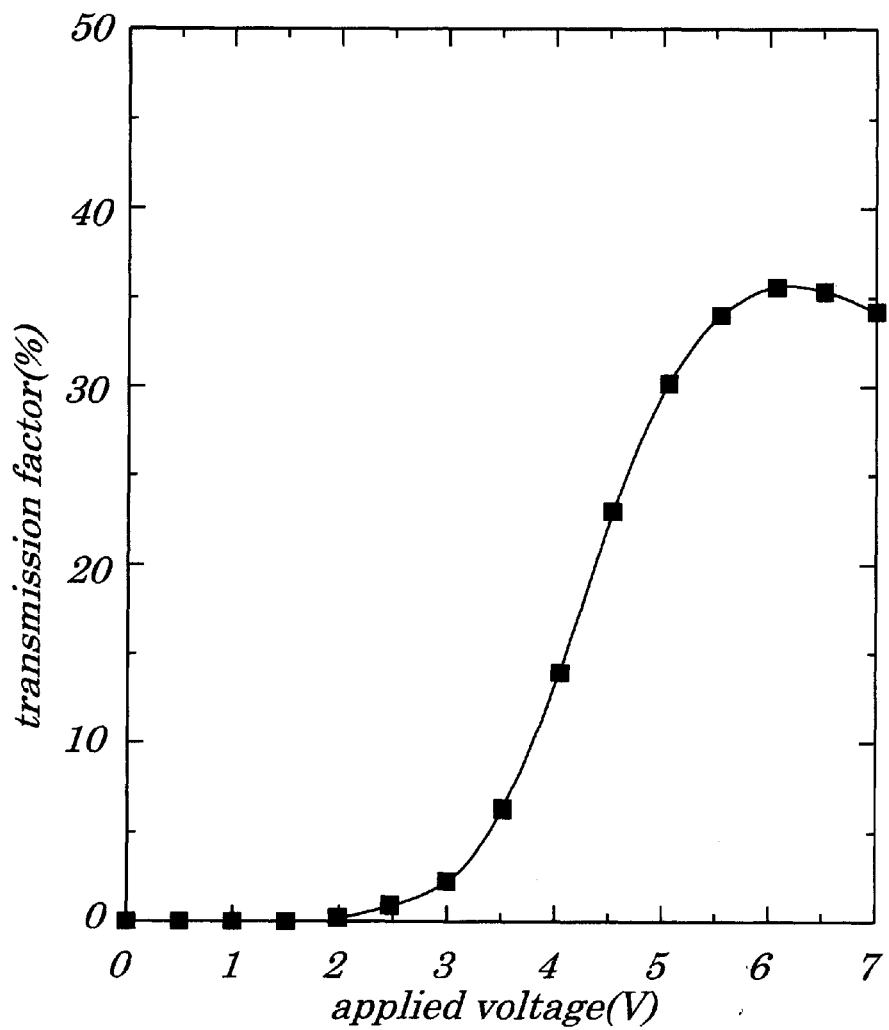
FIG. 6 is a graph showing the relationship between the voltage (V), which is applied to both the pixel electrode and its counter electrode, and the transmission factor.

FIG. 6 is a graph showing the V–T characteristics, i.e., the relationship between the voltage (V), which is applied to both the pixel electrode and its counter electrode, and the transmission factor, the graph being obtained when the liquid crystal display device of this embodiment is viewed from the front side of the device. In this graph: the ordinate shows the transmission factor (%) expressed in a linear scale; and, the abscissa shows the applied voltage (V) expressed also in a linear scale.

As is clear from this graph, it was found that an excellent display is obtained in a contrast of at least 100:1.

Figure 7A:
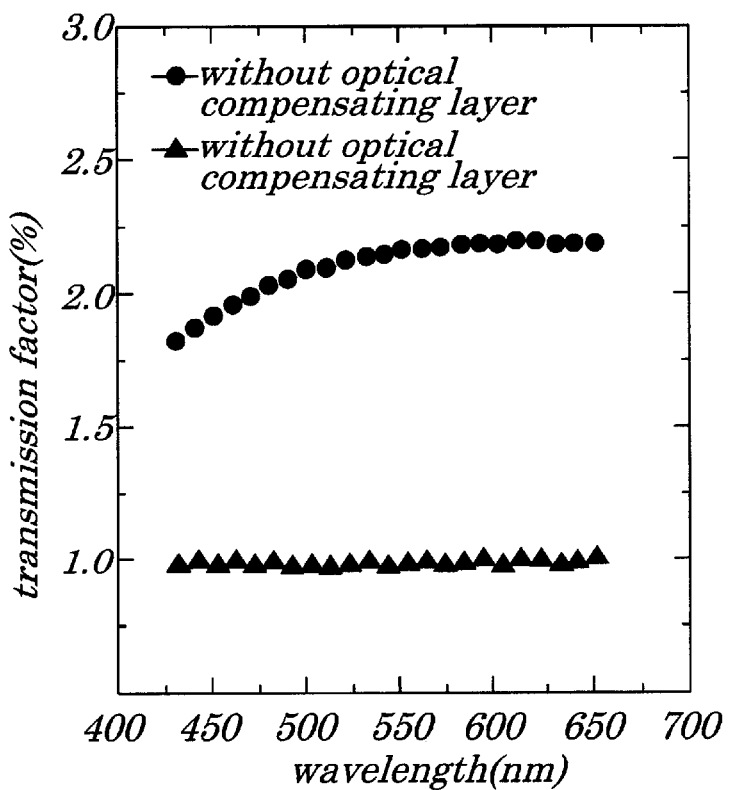
FIGS. 7(a) and 7(b) are graphs showing the relationship between the wavelength and the transmission factor, illustrating the effect of the optical compensation layer in the liquid crystal display device of the present invention.

FIG. 7(*a*) is a graph showing the relationship between the wavelength and the transmission factor, illustrating the effect of the optical compensation layer in the liquid crystal display device of the present invention in comparison with the conventional type of the active matrix liquid crystal display device having no optical compensation layer 9, with respect to the spectrum in the transmission factor obtained when the display device is in its black display mode and is viewed from a direction which forms an angle of 60 degrees with the normal to the substrate and forms an angle of 45 degrees with the rubbing direction of FIG. 1(a). In the graph shown in FIG. 7(a): the ordinate shows the transmission factor (%) expressed in a linear scale; and, the abscissa shows the wavelength (nm) expressed also in a linear scale.

Figure 7B:
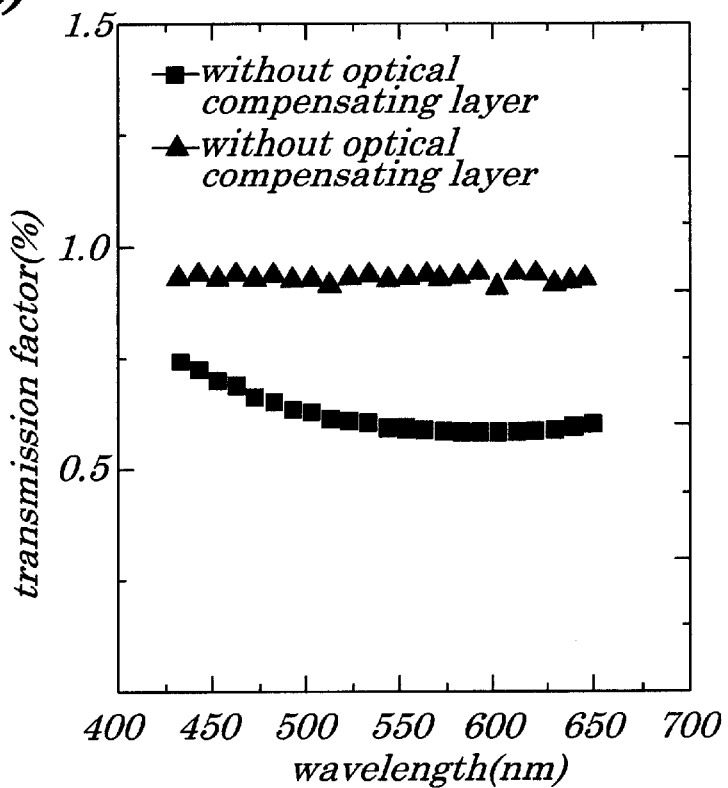

As is in the above graph, FIG. 7(b) is a graph showing the relationship between the wavelength and the transmission factor, illustrating the effect of the optical compensation layer in the liquid crystal display device of the present invention in comparison with the conventional type of the active matrix liquid crystal display device having no optical compensation layer, with respect to the spectrum in the transmission factor obtained when the display device is in its black display mode and is viewed from a direction which forms an angle of 60 degrees with the normal to the substrate and forms an angle of 135 degrees with the rubbing direction of FIG. 1 (a) In the graph shown in FIG. 7(b): the ordinate shows the transmission factor (%) expressed in a linear scale; and, the abscissa shows the wavelength (nm) expressed also in a linear scale.

In the conventional liquid crystal display device described above, when the substrate of the display device is viewed from an oblique direction, the red is larger in transmission factor than the blue so that the reddish coloring problem occurs. In this condition, when the substrate is viewed from a direction perpendicular to the above oblique direction, now the red is smaller in transmission factor than the red so that the bluish coloring problem occurs. In contrast with this, in the active matrix type liquid crystal display device of this embodiment of the present invention, the spectrum in transmission factor is substantially flat, which realizes an excellent display substantially free from any coloring problem.

Further, in this embodiment of the present invention, since the left half of the pixel region rotates counterclockwise while the right half of the same pixel region rotates clockwise, these halves of the pixel region are compensated with each other, which enables both the intermediate tone display and the white display to be free from any coloring problem so that the display device of the present invention may have excellent display characteristics.

Though the embodiment of the present invention has been described in the above with reference to the accompanying drawings, it should be understood that the present invention is not limited in scope to its embodiment only. Any modifications and changes in design of the embodiment may be made without departing from the spirit of the present invention.

For example, in this embodiment of the present invention, as described above, the polarizing axis of the exit side polarizing plate 9 extends in parallel to the projection component of the liquid crystal director 10a projected onto the substrate surface, and the polarizing axis of the incident side polarizing plate 5 is perpendicular to the polarizing axis of the exit side polarizing plate 9. However, it is also possible for the display device of the present invention to have a construction in which the polarizing axis of the incident side polarizing plate 5 extends extends in parallel to the projection component of the liquid crystal director 10a projected onto the substrate surface, and the polarizing axis of the exit side polarizing plate 9 is perpendicular to the polarizing axis of the incident side polarizing plate 5.

Figure 8:
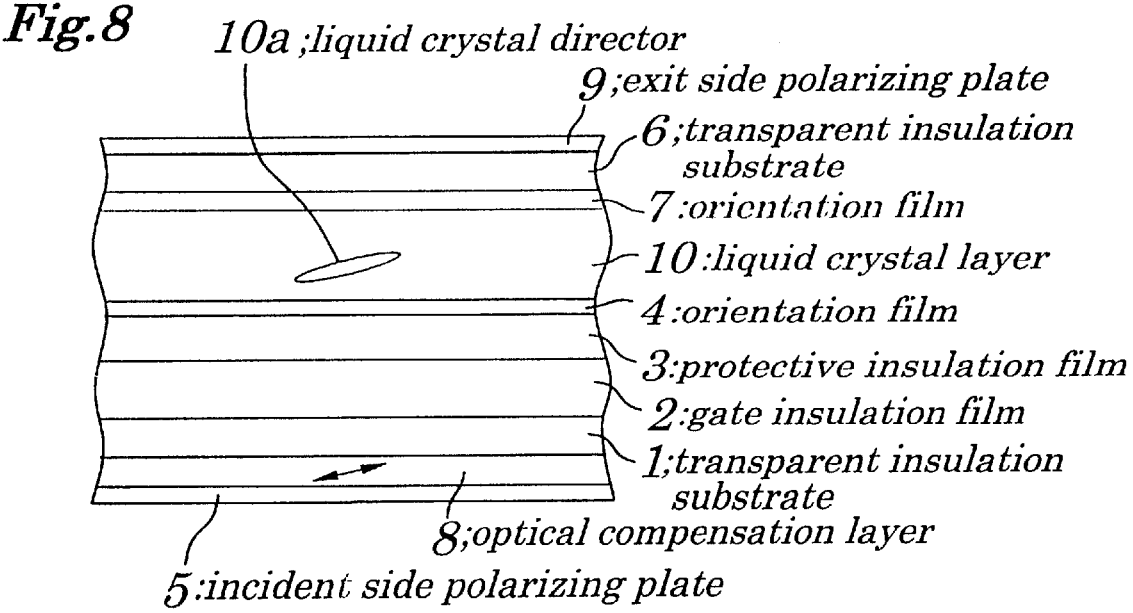
FIG. 8 is a cross-sectional view of an essential part of the liquid crystal display device of another embodiment of the present invention.

Further, in the embodiment of the present invention described above, though the optical compensation layer 8 is interposed between the exit side polarizing plate 9 and the transparent insulation substrate 6, it is also possible to interpose the optical compensation layer 8 between the incident side polarizing plate 5 and the transparent insulation substrate 1, as shown in FIG. 8. Further, it is also possible to interpose the optical compensation layer 8 between the exit side polarizing plate 9 and the transparent insulation substrate 6 and between the incident side polarizing plate 5 and the transparent insulation substrate 1 in a manner such that the sum of the optical compensation layers 8 interposed therebetween is equal in retardation to the liquid crystal layer.

Further, in the embodiment of the present invention, though the rubbing direction is parallel to the scan line 11 and the V-shaped form is used, it is also possible to have the rubbing direction be parallel to the signal line 14 and the V-shaped form inverted. Even when the inverted V-shaped form is used, the optical compensation layer 8 has its anisotropic axis so oriented as to be parallel to the orientation direction of the liquid crystal director 10a which is free from any electric field and includes the pre-tilt angle.

In the present invention having the above construction, the liquid crystal layer is homogeneously oriented in a predetermined direction in the black display mode in a manner such that one of the first and the second polarizing plate has its polarizing axis be substantially parallel to the orientation direction of the liquid crystal layer.

Figure 9A:
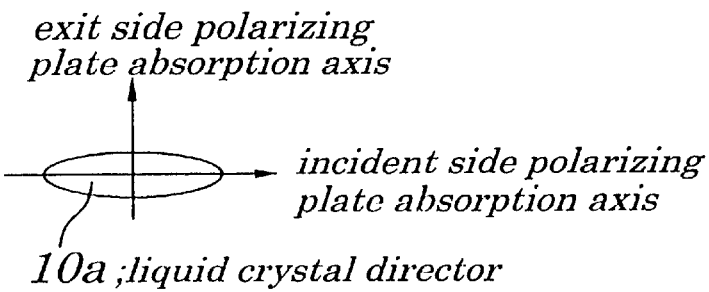
FIGS. 9(a), 9(b) and 9(c) are schematic views illustrating the operation of the liquid crystal display device, more particularly, illustrating the relationships among the liquid crystal director, the absorption axis of the polarizing plate, and the anisotropic axis of the optical compensation layer, illustrating the operation of the liquid crystal display device of the present invention.

Consequently, when the display device is viewed in its black display mode from its front side, as shown in FIG. 9(a), since the absorption axis of the incident side polarizing plate (which axis is perpendicular to the polarizing axis) is parallel to the direction of the liquid crystal director (i.e, anisotropic axis), the light passed through the incident side polarizing plate is subjected to retardation in phase due to the presence of the refractive index anisotropy of the liquid crystal layer.

Figure 9B:
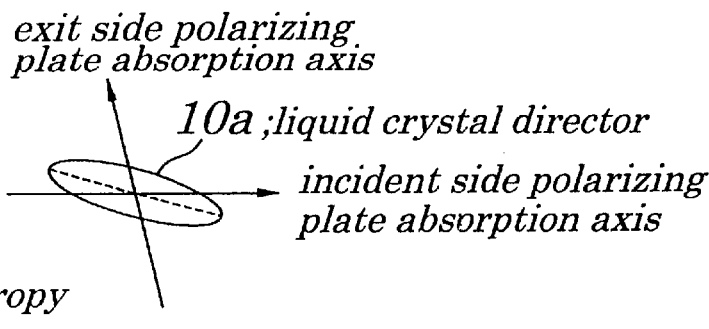

In contrast with this, when the liquid crystal molecule has a predetermined pre-tilt angle and viewed from an oblique direction, as shown in FIG. 9(b), the liquid crystal director differs in direction from the absorption axis of the polarizing plate, which causes a retardation in the liquid crystal layer. As described above, when the retardation occurs in the liquid crystal layer, the amount of the transmissive light varies depending on the relationship between: a product of a difference in refractive index between the ordinary light and the extraordinary light appearing when the light passes through the liquid crystal layer and a traveling distance of the light passing though the liquid crystal layer; and, the wavelength. Due to this, in the black display mode, when leakage of the light occurs in the oblique viewing field, such leakage of the light causes the coloring problem.

In this liquid crystal display device of the present invention, the optical compensation layer has the uniaxial refractive index anisotropy which is different in polarity from the refractive index anisotropy of the liquid crystal layer. This optical compensation layer has the direction of its anisotropic axis be parallel to the orientation direction of the liquid crystal layer, i.e., parallel to the polarizing axis of the polarizing plate. In other words, since the direction of the anisotropic axis of this optical compensation layer and the direction of the polarizing axis are the same in an azimuth angle θ shown in FIG. 10, any retardation does not occur when the display device is viewed from its front side. Consequently, the optical compensation layer does not affect at all the display characteristics of the device viewed from its front side.

Figure 9C:
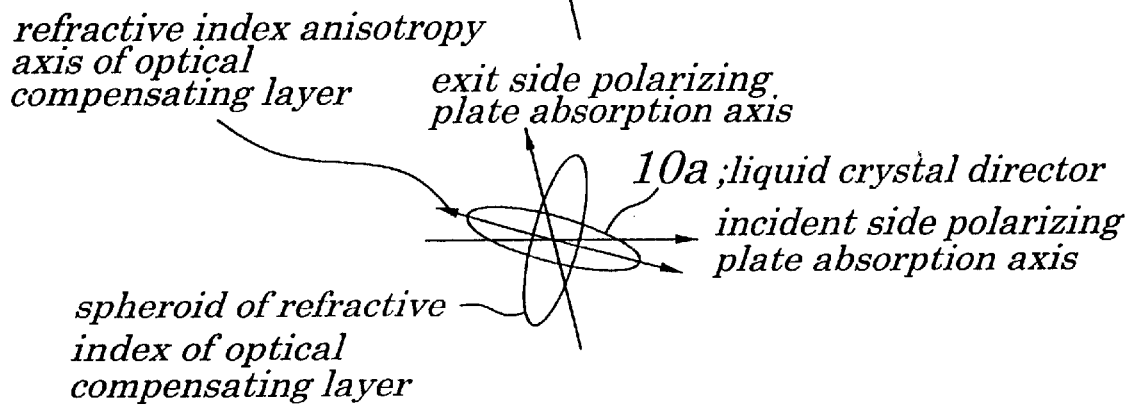

On the other hand, since the direction of the anisotropic axis of the optical compensation layer is parallel to the orientation direction of the liquid crystal layer including the pre-tilt angle, the direction of the anisotropic axis of the optical compensation layer is coincident with the optical axis (i.e., anisotropic axis) of the liqiud crystal layer even when the liquid crystal display device is viewed from any direction, as shown in FIG. 9(C) illustrating this relationship. Consequently, a retardation occurring in the liquid crystal layer after the light passed through the incident side polarizing plate is always offset by the optical compensation layer having the refractive index anisotropy which is different in polarity from that of the liquid crystal layer. Due to this, it is possible to prevent any coloring problem from occurring when the display device is viewed from an oblique direction in its black display mode.

Particularly, when a difference in refractive index anisotropy of the liquid crystal layer is expressed by $\Delta nL$, the thickness of the same layer is expressed by $dL$, a difference in refractive index anisotropy of the optical compensation layer is expressed by $\Delta nF$, and the thickness of the same layer is expressed by $dF$, it is possible to realize the most effective prevention of the coloring problem by substantially establishing the following equation:

$$\Delta nL \times dL = \Delta nF \times dF \qquad (3)$$

In its white display mode, the liquid crystal has been twisted approximately by an angle of 45 degrees based on its initial orientation direction. In this mode, when the liquid crystal is viewed from its front side, a difference in refractive index anisotropy between the ordinary light and the extraordinary light is equal to when a difference $\Delta nL$ in refractive index anisotropy inherent in the liquid crystal. Consequently, when the thickness of the liquid crystal layer is expressed by $dL$, the retardation between the ordinary light and the extraordinary light is expressed by the equation: $\Delta nL \times dL$.

Figure 10:
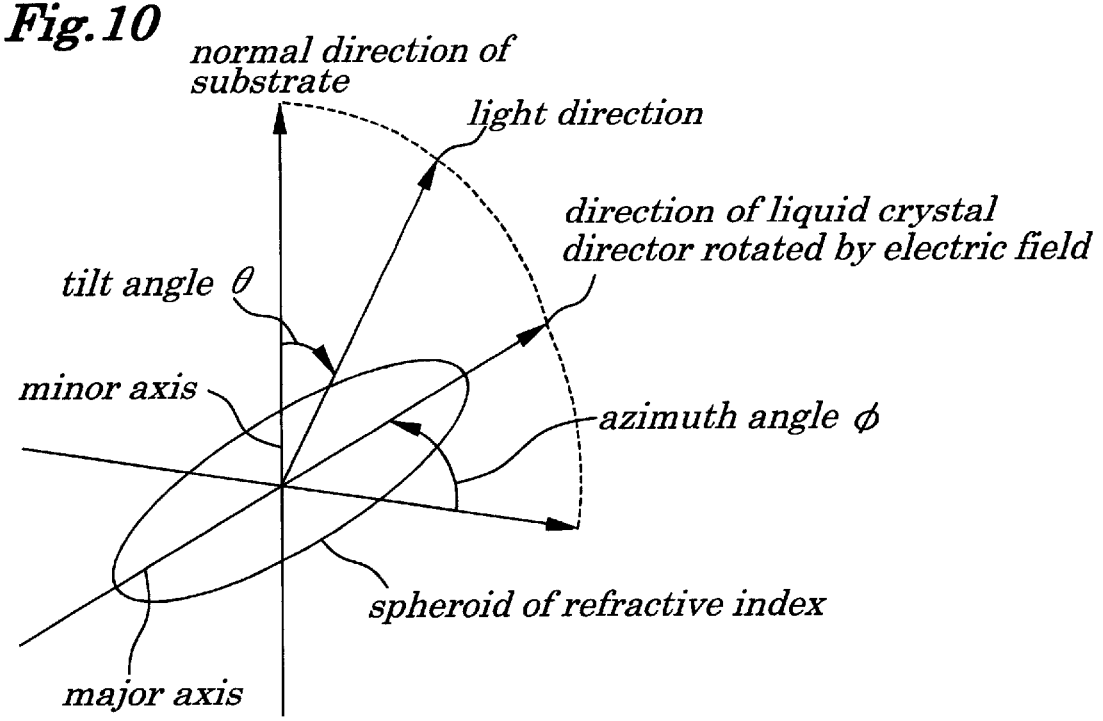
FIG. 10 is a schematic diagram showing the difference in refractive index anisotropy in case that the liquid crystal display device is viewed from an oblique direction, illustrating the operation of the liquid crystal display device of the present invention.
Figure 11:
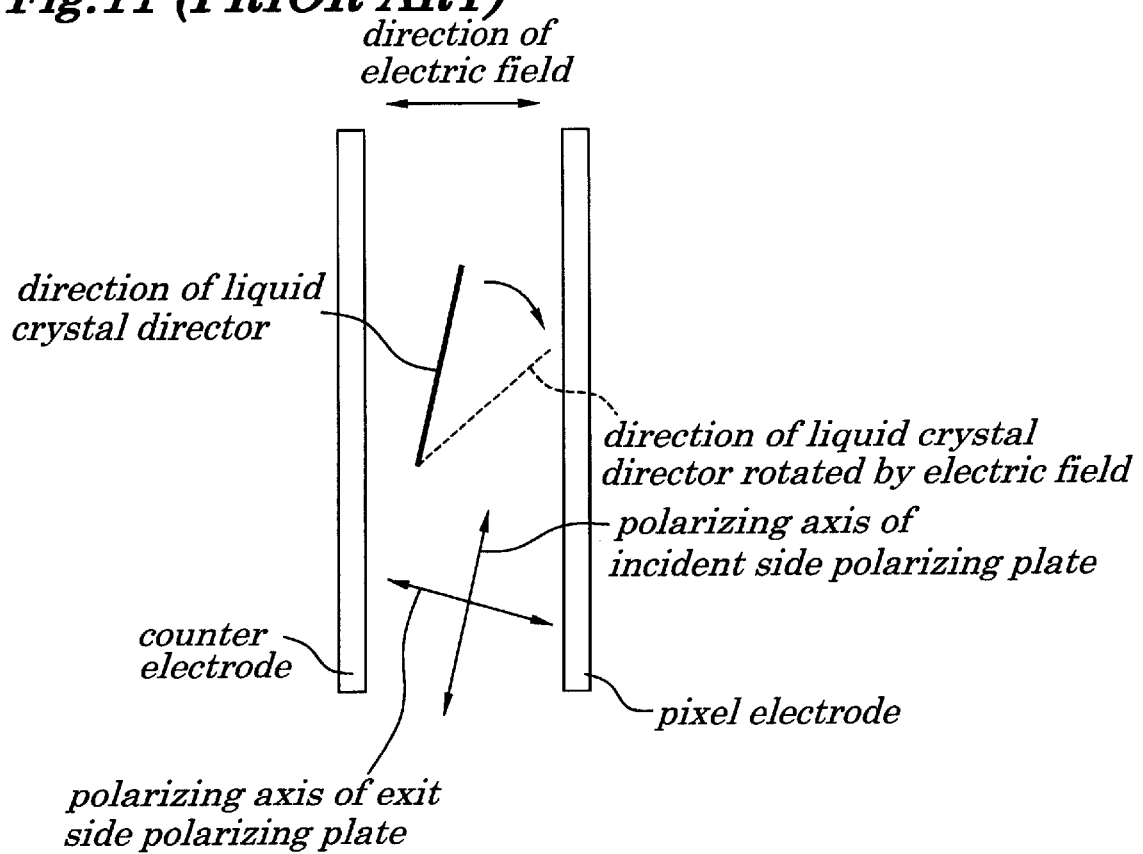
FIG. 11 is a plan view (No. 1) of the conventional liquid crystal display device.
Figure 12:
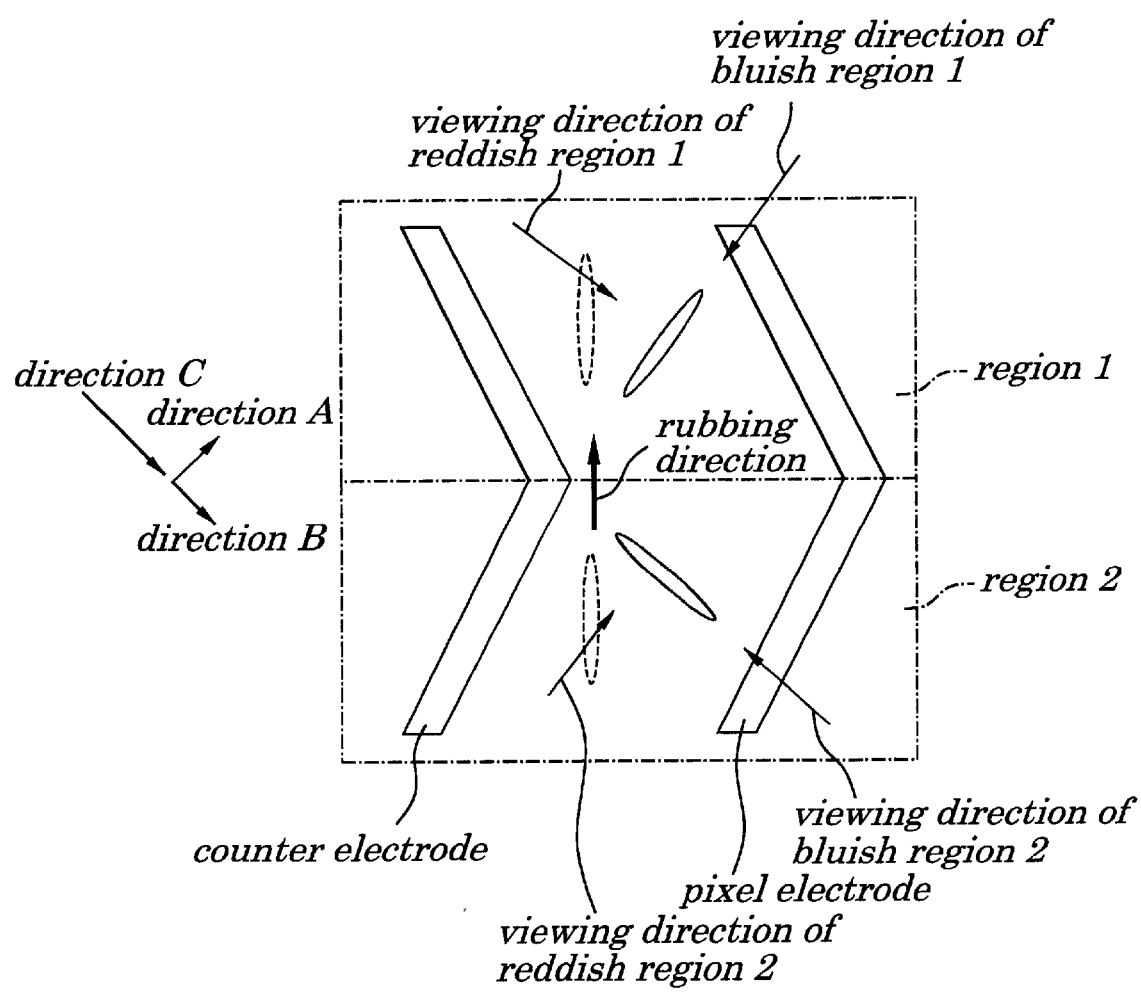
FIG. 12 is a plan view (No. 2) of the conventional liquid crystal display device.

Due to this, when the liquid crystal display device is viewed from the oblique direction, the following occurs: namely As shown in FIG. 10, when the substrate of the display device is viewed from a direction perpendicular to the liquid crystal director, a difference $\Delta n$ in refractive index between the ordinary light and the extraordinary light is equal to a difference between the major axis and the minor axis of an ellipse corresponding to a cross-section of a spheroid of refractive index a major axis of which is parallel to the liquid crystal director, the cross-section being taken along the wavefront of the light. In this case, since the light beam intersects the major axis of the spheroid, the thus obtained cross-section includes the major axis of the spheroid so that the difference $\Delta n$ in refractive index is always equal to the difference $\Delta nL$ in refractive index anisotropy. Consequently, when the angle $\theta$ formed between the light beam and the normal of the substrate increases, the retardation $\Delta n \times L$ increases as the length L of optical path of the light passing through the liquid crystal. Due to this, the more the wavelength increases, the more the transmission facter increases in tendency. In the white display mode of the display device viewed from its front side, the color on the display becomes reddish as the angle $\theta$ increases.

On the other hand, when the display device is viewed from the same direction as that of the liquid crystal director, the difference $\Delta n$ in refractive index between the ordinary light and the extraordinary light decreases as as the angle $\theta$ increases, because the effective length of the major axis decreases while the minor axis keeps its length constant. In this case, the retardation decreases as the angle $\theta$ increases, even when the length of the optical path increases as the angle $\theta$ increases. Due to this, the display on the device becomes bluish as the angle $\theta$ increases.

As described above, as the result of division the electric field into two parts different from each other in direction, in the white diplay mode of the display device, when the device is viewed from an oblique direction C, the pixel's region having the liquid crystal director oriented only in a direction "A" shows a reddish color, while the pixel's region having the liquid crystal director oriented only in a direction "B" shows a bluish color. Since these pixel's regions are compensated with each other, it is possible to considerably resolve the coloring problem occurring when the display device is viewed from the oblique direction.

It is thus apparent that the present invention is not limited to the above embodiments but may be changed and modified without departing from the scope and spirit of the invention.

Finally, the present application claims the priority of Japanese Patent Application No. Hei-10-007634 filed on Jan. 19, 1998, which is herein incorporated by reference.

What is claimed is:

1. In a liquid crystal display device comprising:
   a first and a second transparent substrate oppositely disposed and spaced apart from each other through a cell gap;
   a liquid crystal layer which has a refractive index anisotropy with one polarity and homogeneously oriented in parallel to a surface of said transparent substrate;
   a first and a second polarizing plate having their polarizing axes crossed with each other at right angles, said first and said second polarizing plate being disposed outside said first and said second transparent substrate;
   wherein a pixel electrode and its counter electrode opposite thereto are formed for every pixel on said first transparent substrate, and a voltage is applied between said pixel electrode and said counter electrode to establish an electric field in parallel to said surface of said transparent substrate, whereby said liquid crystal layer is controlled in its orientation, the improvement wherein:
   one of said first and said second polarizing plate has its polarizing axis substantially coincide with the orientation of said liquid crystal layer;
   an optical compensating layer is interposed between at least one of said first and said second transparent substrate and one of said first and said second polarizing plate disposed outside said at least one, said optical compensating layer having an uniaxial refractive index anisotropy different in polarity from said polarity of said refractive index anisotropy of said liquid crystal layer;
   and said optical compensating layer has the direction of its anisotropy axis substantially coincide with the orientation direction of said liquid crystal layer, said orientation direction including a predetermined pre-tilt angle.

2. The liquid crystal display device as set forth in claim 1, wherein:
   each of said pixels is provided with a plurality of regions formed between said pixel electrode and said counter electrode, said regions being different form each other in direction of electric field;
   an angle, which is formed between the direction of said electric field and that of the orientation of said liquid crystal layer free from said electric field, is substantially constant in any of said regions; and
   said liquid crystal layer of said regions permits its liquid crystal molecules to rotate in opposite directions to each other when said electric field is established.

3. The liquid crystal display device as set forth in claim 1, wherein:

a product of ΔnL and dL is substantially equal to a product of ΔnF and dF,

ΔnL is a difference in refractive index anisotropy of said liquid crystal layer, dL is the thickness of said liquid crystal layer, ΔnF is a difference in refractive index anisotropy of said optical compensating layer, and dF is the thickness of said optical compensating layer.

4. The liquid crystal display device as set forth in claim 1, wherein:

at least formed on said first transparent substrate are: a plurality of scan lines; a plurality of signal lines extending in a direction substantially perpendicular to said scan lines; and, a plurality of switching elements disposed in the vicinities of the intersections of said scan lines and said signal lines, each of said switching elements being connected with said pixel electrode.

5. A method of producing a liquid crystal display device, comprising the steps of:

forming a pixel electrode and its counter electrode on a surface of a first transparent substrate for every pixel;

oppositely disposing a second transparent substrate from said first transparent substrate so as to form a cell gap therebetween, in which cell gap a liquid crystal layer having a refractive index anisotropy with one polarity is formed and homogeneously oriented in a direction substantially parallel to a surface of said transparent substrate;

forming an optical compensating layer outside one of said first and said second transparent substrate in a manner such that said optical compensating layer has the direction of its anisotropy axis substantially coincide with the orientation direction of said liquid crystal layer, said orientation direction including a predetermined pre-tilt angle, said optical compensating layer having an uniaxial refractive index anisotropy different in polarity from said polarity of said refractive index anisotropy of said liquid crystal layer; and forming a first and a second polarizing plate having their polarizing axes crossed with each other at right angles, said first and said second polarizing plate being disposed outside said compensating layer and outside said first and said second transparent substrate, one of said first and said second polarizing plate having its polarizing axis substantially coincide with the direction of the orientation of said liquid crystal layer.

6. The method of producing the liquid crystal display device, as set forth in claim 5, wherein:

each of said pixels is provided with a plurality of regions formed between said pixel electrode and said counter electrode, said regions being different form each other in direction of electric field;

an angle, which is formed between the direction of said electric field and that of the orientation of said liquid crystal layer free from said electric field, is substantially constant in any of said regions; and said liquid crystal layer of said regions permits its liquid crystal molecules to rotate in opposite directions to each other when said electric field is established.

* * * * *

UNITED STATES PATENT AND TRADEMARK OFFICE
CERTIFICATE OF CORRECTION

PATENT NO. : 6,285,429 B1
DATED : September 4, 2001
INVENTOR(S) : Shinichi Nishida, Makoto Watanabe and Kimikazu Matsumoto It is certified that error appears in the above-identified patent and that said Letters Patent is hereby corrected as shown below:

<u>Title page,</u>
Item [54], Title, delete "LIQUID CRYSTAL DISPLAY DEVICE AND METHOD FOR ITS PRODUCTION" insert -- ACTIVE MATRIX TYPE LCD DEVICE USING A LATERAL FIELD ELECTRIC DRIVING SYSTEM AND METHOD OF PRODUCTION THEREOF --

<u>Column 2,</u>
Line 20, delete "made" insert -- mode --

<u>Column 6,</u>
Line 3, delete "hand" insert -- 11and --

Signed and Sealed this

Twelfth Day of November, 2002

Attest:

Attesting Officer

JAMES E. ROGAN
Director of the United States Patent and Trademark Office